United States Patent [19]

Embrey

[11] Patent Number: 5,107,796
[45] Date of Patent: Apr. 28, 1992

[54] COMBINED BIRD FEEDER THAT CHIMES

[76] Inventor: Jerry G. Embrey, 521 English Oak, Allen, Tex. 75002

[21] Appl. No.: 731,816

[22] Filed: Jul. 17, 1991

[51] Int. Cl.$^5$ .............................................. A01K 7/00
[52] U.S. Cl. ..................... 119/72; 119/57.8; D30/124
[58] Field of Search ............. 119/52.2, 57.8, 72, 119/77; 81/402, 403, 404, 406; 116/141, 169; D30/124; D17/99; D10/116; D11/141

[56] References Cited

U.S. PATENT DOCUMENTS

| | | | |
|---|---|---|---|
| 864,461 | 8/1907 | Gibbs | 116/169 |
| 2,487,087 | 11/1949 | Anderson | 119/52.2 |
| 2,987,041 | 6/1961 | Bard | 119/52.2 X |
| 4,632,061 | 12/1986 | Tucker et al. | 119/51 R |
| 4,966,098 | 10/1990 | Freeman | 119/52.2 |
| 4,967,633 | 11/1990 | Jewell, Jr. | 84/404 |

FOREIGN PATENT DOCUMENTS

| | | | |
|---|---|---|---|
| 3844186 | 7/1990 | Fed. Rep. of Germany | 84/402 |
| 989929 | 4/1965 | United Kingdom | 119/52.2 |
| 2127266 | 4/1984 | United Kingdom | 119/57.8 |

Primary Examiner—John G. Weiss
Assistant Examiner—Nicholas D. Lucchesi

[57] ABSTRACT

Primarily a nectar type hummingbird feeder with multiple elongated striker reservoirs equipped with a nectar type access lid with perching apparatus. The elongated striker reservoirs surround a center chiming element all being suspended from a decorative hanging canopy. The decorative hanging canopy is held by an equalizing hanging apparatus. The equalizing hanging apparatus is designed to hold the bird feeder in an operable position whenever one or more of the elongated striker reservoirs are removed for refilling or cleaning. Each elongated striker reservoir is easily detached from a hooking device.

3 Claims, 1 Drawing Sheet

COMBINED BIRD FEEDER THAT CHIMES

BACKGROUND-FIELD OF INVENTION

This invention relates to bird feeders, specifically a bird feeder that chimes. Heretofore, bird feeders have been designed and marketed to be single purpose, one season feeders, especially the nectary type feeders. None for any purpose other than feeding birds. Some bird feeders have been marketed employing a plurality of feeding reservoirs, as disclosed in U.S. Pat. No. 4,632,061, wherein the compartments are for dry food only. Some feeders are adapted to feed nectar feeding birds only. Some are adapted to be dry feeders and are designed to attract different species of birds; but none are designed to be adaptable to dual purpose feeding, convertible from liquid feeding reservoirs to solid food reservoirs, nor employing an added attraction, such as chiming. Bird feed reservoirs constructed primarily of plastic or wood tend to wear and deteriorate with weather elements and usage as in U.S. Pat. No. 4,632,061. They tend to become hard to snap open or fail to stay closed properly. Another disadvantage is the difficulty encountered in cleaning many bird feeders that are angular in design as in the afore mentioned art, whereas a reservoir of glass or such like is long lasting and a spherical design would be easy to clean and sanitize, having no inside corners. Also many feeders are difficult to fill and clean, whereby the entire unit must be removed. With the growing public interest in birds and nature activities, there is a continual need for attractive, multi-compartment, multi-use bird feeders that conserves space as well as perform multiple usage. It is especially important to the elderly or handicapped to have reservoirs that do not stick or jam, whereas this new invention is simply unhooked. It would be most advantageous to have one unit that would be convenient to fill and clean and that would be functional year-round. This new invention can simply be used as a wind chime at any time whether or not its is being used as a bird feeder.

OBJECTS AND ADVANTAGES

Accordingly, several objects and advantages of my invention are:

(a) to provide a multiple feeding reservoir bird feeder that chimes.

(b) to provide a multiple feeding reservoir bird feeder convertible from liquid food to solid food.

(c) to provide a bird feeder and chime that conserves space.

(d) to provide a multiple feeding reservoir that can be easily cleaned, refilled and rehung.

(e) to provide an invention that is an improved bird feeder being novel and colorful—having both eye and ear appeal.

(f) further objects of the invention include the provision of being a wind chime at any time whether or not it is being used as a bird feeder.

(g) further objects and advantages of my invention will become apparent from a consideration of the drawings and ensuing description of it.

LIST OF NUMERICAL NUMBERS

10—Equalizing Hanging Apparatus
12—Decorative Hanging Canopy
14—Upper Attachment Means
16—Hanging Means
18—Lower Attachment Means
20—Center Hanging Means
22—Center Attachment Means
24—Center Chiming Element
26—Center Connecting Device
28—Elongated Striker Reservoir
30—Hooking Device
32—Feed Access Lid
34—Perching Apparatus

DETAILED DESCRIPTION OF THE PREFERRED EMBODIMENT

Figure 1:
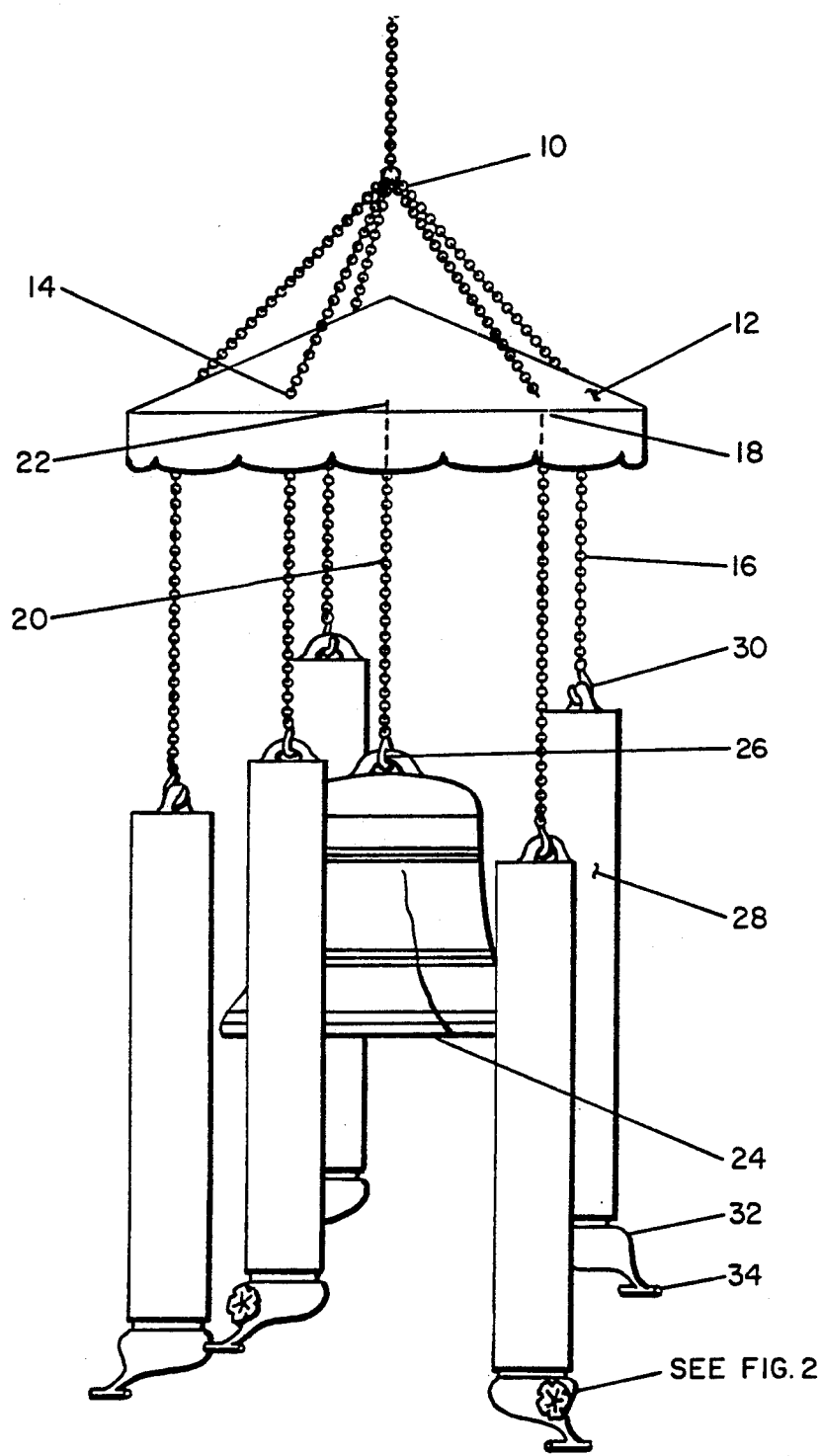
FIG. 1 is a side view of my invention showing the perspective view of the multiple elongated striker reservoirs with the center chiming element.
Figure 2:
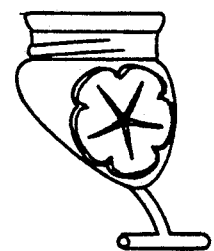
FIG. 2 is a view of the feed access lid with perching apparatus.

The combined bird feeder that chimes as shown in FIG. 1 is comprised of a decorative hanging canopy (12) suspended from an equalizing hanging apparatus (10). The decorative hanging canopy (12) is comprised of formed acrylic, plastic or other weather-resistant materials. The decorative hanging canopy (12) is formed in a circular tent top like formation with a downward extended rigid sidewall that has a scalloped edge and is strikingly decorated for eye-appeal. The decorative hanging canopy (12) has on the inside circumference of its underneath side, a hanging means (16) having means for attachment in the form of a rigid loop, hook, or the like (18), equally spaced surrounding a center hanging means (20), also having means for attachment in the form of a rigid loop, hook, or the like (22). Each hanging means (16) is made of chain or flexible type material allowing it to swing freely. Each hanging means (16) has a removable elongated striker reservoir (28) attached by means of a hooking device (30). Each elongated striker (28) is equipped with a feed access lid (32) with a perching apparatus (34) as shown in FIG. 2. The feed access lid (32) as shown in FIG. 2, in this case, is constructed for nectar feeding birds. The feed access lid is attached to the elongated striker reservoir (28) by means of threads inside the feed access lid (32) matching threads on the elongated striker (28). The center hanging means (20) is also constructed of chain or flexible material to allow it to swing freely and is attached to the decorative hanging canopy (12) by means of a loop, hook, or the like (22). The center hanging means (20) has a center chiming element (24) attaching by means of a connecting device (26). The center chiming element (24) in this case, but not limited to, is a bell shaped object made of glass material or such like so whenever the elongated striker reservoirs (28) also made of glass material or such like, come in contact with each other, due to wind or creature movement, create a chiming effect. The equalizing hanging apparatus (10) attached to the decorative hanging canopy (12) by means for attachment (14), allows one or more elongated striker elements (28) to be removed one at a time for refilling or cleaning while holding the feeder in an operable position. The equalizing hanging apparatus (10) also allows one or more of the elongated striker reservoirs (28) or the center chiming element (24) to be removed without disassembling the whole unit. Additionally, the equalizing hanging apparatus (10) compensates for unevenly distributed weight should the liquid level in the elongated striker reservoirs (28) become uneven.

While my description contains many specificities, these should not be construed as limitations on the scope of the invention, but rather as an exemplication of one preferred embodiment thereof. Many other variations are possible. For example, by changing the design of the feed access lid (32) the elongated striker reservoirs (28) could accommodate seeds or dry bird food. Further variations would include size of elongated striker reservoirs, configuration of center chiming element and decorative hanging canopy. Accordingly, the scope of the invention should be determined not by the embodiments illustrated, but by the appended claims and their legal equivalents.

I claim:

1. A bird feeder that chimes which comprises:
   (a) a decorative hanging canopy with adequate means for suspension
   (b) a chiming element suspended from said decorative hanging canopy
   (c) a plurality of elongated striker reservoirs
   (d) a feed access lid with perching apparatus attached at the bottom end of each elongated striker reservoir.

2. A bird feeder as recited in claim 1 wherein a chime effect is produced by movement of said elongated striker reservoirs striking against said chiming element caused by wind and bird movement.

3. A bird feeder as recited in claim 1 wherein the means for suspension is an equalizing hanging apparatus that is designed to hold said feeder in an operable position when 1 or more said elongated striker reservoirs are removed for cleaning and refilling.

* * * * *